United States Patent [19]

Tamba et al.

[11] Patent Number: 4,891,940
[45] Date of Patent: Jan. 9, 1990

[54] MUFFLER COOLING STRUCTURE FOR LIQUID-COOLED ENGINE SYSTEM

[75] Inventors: Shinichi Tamba, Kakogawa; Hitomi Miyake, Miki, both of Japan

[73] Assignee: Kawasaki Jukogyo Kabushiki Kaisha, Japan

[21] Appl. No.: 122,013

[22] Filed: Nov. 17, 1987

[30] Foreign Application Priority Data

Nov. 20, 1986 [JP] Japan ................................ 61-277932

[51] Int. Cl.$^4$ ............................................... F01N 3/02
[52] U.S. Cl. ........................................ 60/320; 180/68.1;
123/41.49; 165/44
[58] Field of Search ................. 165/41, 44; 123/41.49,
123/198 E; 60/320; 180/68.1, 68.2, 68.4

[56] References Cited

U.S. PATENT DOCUMENTS

| | | | |
|---|---|---|---|
| 2,078,420 | 4/1937 | Sheldrick | 60/320 X |
| 2,177,687 | 10/1939 | Bracken et al. | 123/41.49 |
| 3,413,804 | 12/1968 | Schongs et al. | 60/320 X |
| 3,827,523 | 8/1974 | Williams | 165/44 |
| 3,859,965 | 1/1975 | Hatz et al. | 123/41.62 X |
| 4,060,985 | 12/1977 | Fukushima | 60/320 X |
| 4,265,332 | 5/1981 | Presnall et al. | 180/68.1 X |
| 4,371,047 | 2/1983 | Hale et al. | 180/68.1 |
| 4,503,931 | 3/1985 | Sugimoto et al. | 123/198 E X |
| 4,535,862 | 8/1985 | LeBlanc | 180/68.4 X |
| 4,590,891 | 5/1986 | Fujikawa et al. | 123/41.49 X |
| 4,610,326 | 9/1986 | Kirchweger et al. | 180/68.1 |
| 4,633,965 | 1/1987 | Tsurumi et al. | 165/41 X |

FOREIGN PATENT DOCUMENTS 61-136127 8/1986 Japan .
2174652 11/1986 United Kingdom ............... 180/68.4

*Primary Examiner*—Randall L. Green
*Attorney, Agent, or Firm*—Leydig, Voit & Mayer

[57] ABSTRACT

A liquid-cooled engine system comprising a liquid-cooled engine and a radiator which are arranged within an engine room. A duct is arranged within the engine room, for guiding air flow having passed through the radiator, to the outside of the engine room without exposure of the air flow to the engine. At least a part of the exhaust muffler connected to the engine is disposed within the duct so that the exhaust muffler is cooled by at least a part of the air flow guided by the duct. Preferably, the engine is a vertical type V-engine.

19 Claims, 1 Drawing Sheet

MUFFLER COOLING STRUCTURE FOR LIQUID-COOLED ENGINE SYSTEM

BACKGROUND OF THE INVENTION

The present invention relates to a muffler cooling structure for a liquid-cooled engine system mounted on, for example, motive working machines such as agricultural tractors or the like, generators and the like.

In an agricultural tractor having mounted thereon a liquid-cooled engine, an exhaust muffler is disposed on the outside of an engine compartment or housing in order to prevent a rise in temperature within the engine compartment. This necessitates provision of a strict or cumbersome protecting cover or the like to protect an operator from touching the exhaust muffler. Further, disposition of the exhaust muffler on the outside of the engine housing inevitably enlarges the overall external dimensions of the tractor.

In recent years, a system has been developed in which purging due to exhaust gas is utilized to cool the exhaust muffler disposed within the engine compartment. It is difficult for such system, however, to sufficiently cool the exhaust muffler.

As the prior art, there is Japanese Utility Model Application Laid-Open No. 61-136127.

SUMMARY OF THE INVENTION

It is an object of the invention to provide a liquid-cooled engine system in which air flow having passed through a radiator is effectively utilizied to efficiently cool an exhaust muffler arranged within or near an engine room, to thereby prevent a rise in temperature within the engine housing.

It is another object of the invention to provide a liquid-cooled engine system which can achieve the above-mentioned object and, in addition thereto, the overall dimension of the engine housing can be maintained compact in spite of the fact that the exhaust muffler is disposed within or near the engine housing, and the exhaust muffler can more effectively be cooled.

According to the invention, there is provided a liquid-cooled engine system comprising:

a liquid-cooled engine arranged within an engine housing;

a radiator arranged within the engine housing, cooling liquid for the engine flowing through said radiator;

means for generating air flow passing through the radiator to cause the air flow to cool the cooling liquid flowing through the radiator;

duct means arranged within the engine housing, for guiding the air flow having passed through the radiator, to the outside of the engine housing without exposure of the air flow to the engine; and an exhaust muffler connected to the engine, at least a part of the exhaust muffler being disposed within the duct means so that the exhaust muffler is cooled by at least a part of the air flow guided by the duct means.

According to the invention, there is also provided a liquid-cooled engine system comprising:

a liquid-cooled vertical-type V-engine arranged within an engine housing and having a vertically extending crankshaft;

a radiator arranged within the engine housing and above the crankshaft, cooling liquid for the engine flowing through the radiator;

means for generating air flow passing through the radiator to cause the air flow to cool the cooling liquid flowing through the radiator;

duct means extending from a location above the engine to a location at a bottom of the engine housing through a location in front of a V-bank of the engine, for guiding the air flow having passed through the radiator, to the outside of the engine housing without exposure of the air flow to the engine; and an exhaust muffler connected to the engine and disposed at an outlet end of the duct means which opens to the outside of the engine housing, so that the exhaust muffler is cooled by at least a part of the air flow guided by the duct means.

DETAILED DESCRIPTION

Figure 1:
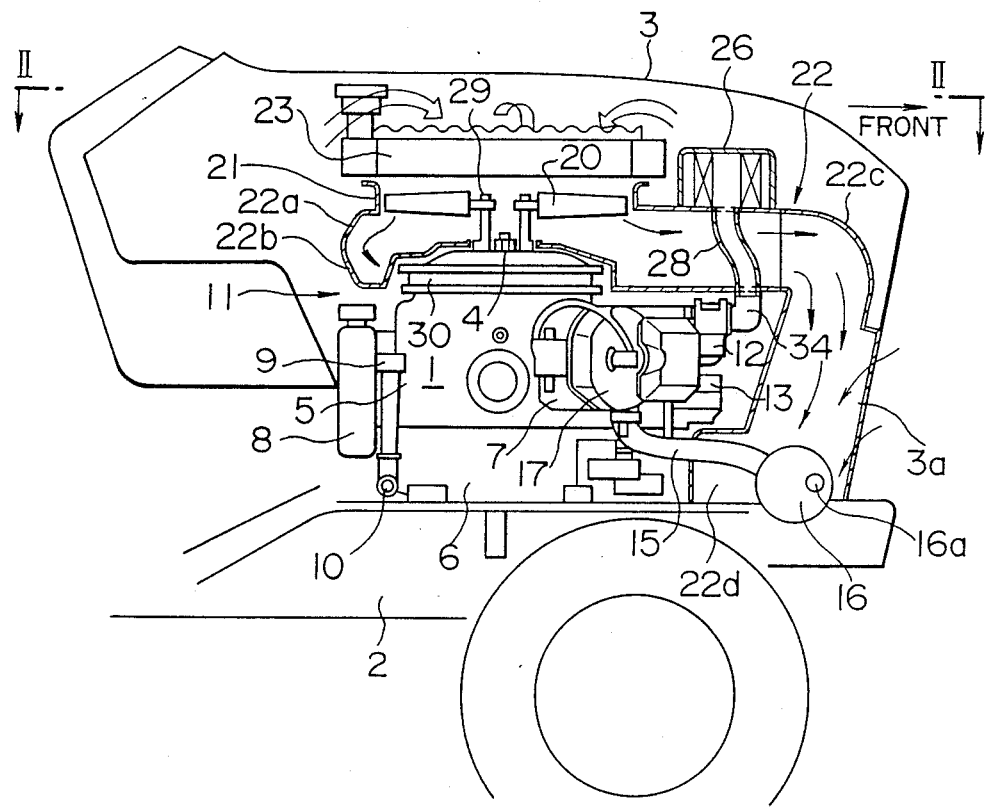
FIG. 1 is a schematic, fragmental longitudinal cross-sectional view showing a tractor having mounted thereon a liquid-cooled engine system according to an embodiment of the invention.
Figure 2:
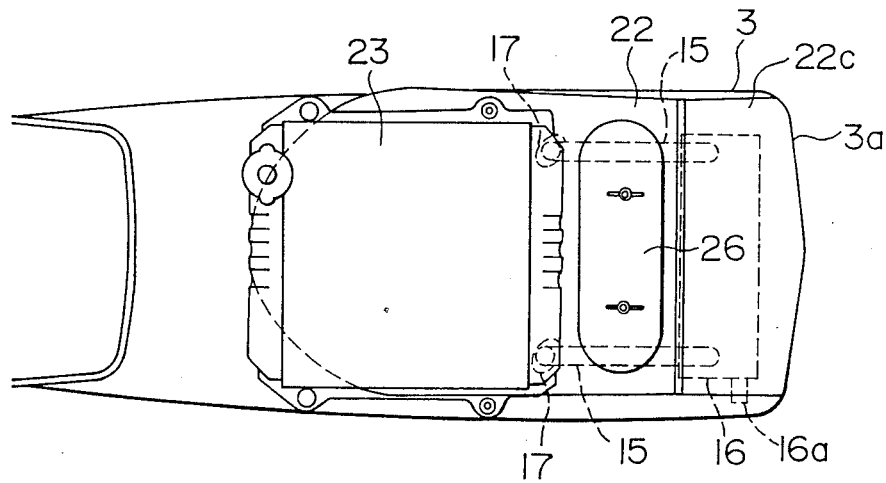
FIG. 2 is a cross-sectional view taken along line II—II in FIG. 1.

Referring to FIGS. 1 and 2, there is illustrated a tractor having mounted thereon a liquid-cooled engine system according to an embodiment of the invention. As clearly shown in FIG. 1, the engine system comprises a vertical crankshaft V-type gasoline engine 1 having a vertically extending crankshaft 4. The engine 1 is mounted on a front axle bracket 2 of the tractor and is arranged within an engine housing 11 defined by a bonnet or hood 3. The engine 1 has a crankcase 5 on the rear side and an oil pan 6 on the lower side. The engine 1 also has a pair of cylinders 7 on the front side. The pair of cylinders 7 on the front side is arranged in a V-shape opening or facing forwardly to define a V-bank. Arranged at the rear of the engine 1 are a cooling liquid reservoir tank 8, an oil feed bore 9 and an oil drain outlet 10. Arranged in front of the engine 1 are a carburetor 12 and a fuel pump 13.

As clearly shown in FIG. 2 which is a cross-sectional view taken along line II—II in FIG. 1, a pair of exhaust pipes 15 and 15 are connected respectively to a pair of cylinder heads 17 and 17 of the engine 1. The exhaust pipes 15 and 15 extend substantially parallel with each other from the cylinder heads 17 and 17 forwardly and downwardly and are connected to a cylindrical exhaust muffler 16. The exhaust muffler 16 is arranged laterally horizontally at the bottom of a front portion of the engine housing 11.

Upper and side walls of the hood 3 are formed respectively with cooling air intake ports, and the front wall 3a of the hood 3 is also formed with an auxiliary cooling air intake port.

A radiator 23 is arranged above the engine 1 and is resiliently supported by the crankcase 5 through suitable brackets and rubber members. The radiator 23 is connected to the water jacket of the engine 1 such that the cooling liquid is recirculated from and to the water jacket through the radiator 23. A radiator cooling fan 20 is disposed between the radiator 23 and the engine 1 for generating air flow passing through the radiator 23 to cool the cooling liquid flowing through the radiator 23. The fan 20 is fixedly connected to a flywheel 30 through an extension bracket 29. The fan 20 is surrounded by a shroud 21 having a lower end to which a duct 22 is connected for guiding the air flow having passed through the radiator 23.

The duct 22 extends forwardly along the top of the engine 1 to shield the same from the heated air flow having passed through the radiator 23. The duct 22 is bent at a location in front of and above the V-bank of the engine 1 and extends downwardly along the rear face of the front wall 3a of the bonnet 3. The duct 22 has an enlarged lower outlet end portion 22d which is located at the bottom of the front portion of the engine housing 11 and which opens downwardly to the outside of the engine housing 11. The exhaust muffler 16 is arranged at the outlet end portion 22d of the duct 22 such that at least a part of the exhaust muffler 16 is disposed within the duct 22. At least a half of each of the exhaust pipes 15 is also disposed within the outlet end portion 22d of the duct 22.

The duct 22 is formed of a resin material and is divided into, for example, three portions including upper and lower portions 22a and 22b and a front portion 22c. The lower portion 22b is resiliently supported on the upper face of the crankcase 5 through an elastic member such as rubber or the like. The upper portion 22a is integrally molded with the shroud 21 and is joined to the lower portion 22b by a plurality of bolts or a socket and spigot joint (not shown). The front portion 22c is fixedly mounted to the hood 3, the front axle bracket 2 or the like.

An air cleaner 26 is mounted on the top face of the duct 22 and is located substantially just above the carburetor 12. The air cleaner 26 is connected to an intake pipe 34 by a pipe 28 which extends vertically through the duct 22. The intake pipe 34 is connected to the carburetor 12.

As shown in FIG. 2, the exhaust muffler 16 is arranged horizontally and perpendicularly to the advance direction of the tractor, and has an outlet 16a at axial one end of the exhaust muffler 16. The pair of right and left exhaust pipes 15 and 15 are formed to have the same length and extends from the respective cylinder heads 17 and 17 to the exhaust muffler 16 straight as viewed from the above.

The operation of the engine system illustrated in FIGS. 1 and 2 will be described.

Air drawn through the cooling air intake ports in the hood 3 is caused to pass vertically through the radiator 23 by the fan 20, to cool the cooling liquid flowing through the radiator 23. The air having passed through the radiator 23 flows into the duct 22 and is guided thereby forwardly. The air is then guided by the duct 22 downwardly at the location in front of the engine 1, and cools the exhaust muffler 16 at the outlet end portion 22d of the duct 22. Subsequently, the air is discharged downwardly to the outside of the engine room 11 through the outlet end portion 22d.

In course of the flow of air through the duct 22, the warm air having passed through the radiator 23 is not exposed to the engine 1 and does not exert thermal influence on the engine 1. The air reliably cools the exhaust muffler 16 and, immediately thereafter, is discharged to the outside of the engine housing 11 through the outlet end portion 22d of the duct 22.

Since the exhaust muffler 16 is disposed substantially within the engine housing 11, the exhaust muffler 16 does not project outwardly from the hood 3. Thus, the external dimension of a vehicle such as the tractor or the like or a generator having mounted thereon the engine system can be made compact and, of course, the appearance can also be improved. Moreover, a protecting cover for the exhaust muffler 16 can be dispensed with or can be simplified in structure. This is advantageous from the point of view of cost.

Further, the arrangement of the illustrated embodiment is such that the duct 22 is provided for guiding the air flow having passed through the radiator 23 to the outside of the engine housing 11 without exposure of the air flow to the engine 1, and the exhaust muffler 16 is disposed at the outlet end portion 22d of the duct 22. With such arrangement, it can be ensured that the exhaust muffler 16 arranged substantially within the engine housing 11 is cooled by the air flow, making it possible to prevent a rise in temperature within the engine housing 11. Thus, good running performance of the engine 1 can be maintained or secured.

Furthermore, since the exhaust muffler 16 is arranged at a location in front of and below the V-bank of the vertical type V-engine 1, the pair of right and left exhaust pipes 15 and 15 can be made equal in length to each other and can be shortened. Thus, the piping arrangement is simplified while satisfying the fundamental requirements for the exhaust system of the engine 1. That is to say, the entire engine housing 11 can be maintained compact in size in spite of the fact that the exhaust muffler 16 is disposed substantially within the engine room 11.

Since the exhaust muffler 16 is disposed at a location in front of and below the V-bank of the vertical crankshaft V-type engine 1 and is accommodated in the outlet end portion 22d of the duct 22, heat from the exhaust muffler 16 can be immediately discharged to the outside of the engine room 11. This makes is possible to more effectively prevent a rise in temperature within the engine housing 11 due to heat radiation from the exhaust muffler 16.

Moreover, since the exhaust muffler 16 is arranged at the location in front of and below the V-bank of the vertical crankshaft V-type engine 1, the cooling air intake port formed, for example, in the front wall 3a of the bonnet 3 can easily be connected to the duct 22. This makes is possible to easily utilize air introduced through the intake port during running of the vehicle, as auxiliary cooling air for the exhaust muffler 16.

Although the embodiment of the invention has been described above in detail, the invention should not be limited to this specific form. Various changes, modifications and variations can be made to the invention. For example, the whole of the exhaust muffler 16 may be disposed within the duct 22. In other words, the exhaust muffler 16 may be arranged at a midpoint of the duct 22. Further, the exhaust muffler 16 may be disposed below the engine housing 11. Moreover, it is not necessarily required to employ the whole of the air having passed through the radiator 23, to cool the exhaust muffler 16, but a part of the air having passed through the radiator 23 may be utilized to cool the exhaust muffler 16 and the remaining air may directly be discharged to the outside of the engine room 11.

As described above, the arrangement of the liquid-cooled engine system according to the invention is such that duct means is arranged within the engine room, for guiding air flow having passed through the radiator, to the outside of the engine room, and at least a part of the exhaust muffler is disposed within the duct means so that the exhaust muffler is cooled by at least a part of the air flow guided by the duct means. With such arrangement of the invention, it is possible to prevent or restrain a rise in temperature within the engine room due to heat radiation from the exhaust muffler. Thus, heat problems of the fuel system due to the temperature rise within the engine room can be eliminated. Further, since the exhaust muffler is cooled positively and sufficiently, a protecting cover for the exhaust muffler can be dispensed with or can be simplified in structure.

What is claimed is:

1. A liquid-cooled engine system comprising:
   a liquid-cooled engine arranged within an engine housing;
   a radiator arranged within the engine housing, cooling liquid for said engine flowing through said radiator;
   means for generating air flow passing through said radiator to cause the air flow to cool the cooling liquid flowing through said radiator;
   duct means arranged within the engine housing, for guiding the air flow having passed through said radiator to the outside of the engine housing without exposure of the air flow to said engine; and
   an exhaust muffler located in the vicinity of the bottom of said engine and connected to said engine, at least a part of said exhaust muffler being disposed within said duct means so that said exhaust muffler is cooled by at least a part of the air flow guided by said duct means.

2. A liquid-cooled engine system as defined in claim 1, wherein said duct means has an outlet end opening to the outside of the engine housing, said exhaust muffler being disposed at said outlet end of said duct means.

3. A liquid cooled engine system according to claim 1 wherein said exhaust muffler is located forward of said engine.

4. A liquid-cooled engine system as defined in claim 1, including exhaust pipe means through which said exhaust muffler is connected to said engine, at least a half of said exhaust pipe means extending within said duct means.

5. A liquid-cooled engine system as defined in claim 4, wherein said exhaust muffler is arranged horizontally, and said exhaust pipe means comprise a pair of exhaust pipes having substantially the same length, said exhaust pipes being connected in parallel to said exhaust muffler.

6. A liquid-cooled engine system comprising:
   a liquid-cooled vertical-type V-engine arranged within an engine housing room and having a vertically extending crankshaft;
   a radiator arranged within the engine housing and above said crankshaft, cooling liquid for the engine flowing through said radiator;
   means for generating air flow passing through said radiator to cause the air flow to cool the cooling liquid flowing through said radiator;
   duct means extending from a location above said engine to a location at a bottom of the engine room through a location in front of a V-bank of said engine, for guiding the air flow having passed through said radiator, to the outside of the engine housing without exposure of the air flow to said engine; and
   an exhaust muffler connected to said engine and disposed at an outlet end of said duct means which opens to the outside of the engine housing, so that said exhaust muffler is cooled by the air flow guided by said duct means.

7. A liquid-cooled engine system as defined in claim 6, wherein said outlet end of said duct means opens downwardly.

8. A liquid-cooled engine system as defined in claim 6, including exhaust pipe means through which said exhaust muffler is connected to said engine, at least a half of said exhaust pipe means extending within said duct means.

9. A liquid-cooled engine system as defined in claim 8, wherein said exhaust muffler is arranged horizontally, and said exhaust pipe means comprise a pair of exhaust pipes having substantially the same length, said exhaust pipes being connected in parallel to said exhaust muffler.

10. A liquid-cooled engine system comprising:
    a liquid-cooled engine arranged within an engine housing;
    a radiator arranged within the engine housing, cooling liquid for said engine flowing through said radiator;
    means for generating air flow passing through said radiator to cause the air flow to cool the cooling liquid flowing through said radiator;
    duct means arranged within the engine housing and having an inlet portion located in the vicinity of the upper portion of said engine for guiding the air flow having passed through said radiator to the outside of the engine housing without exposure of the air flow to said engine; and
    an exhaust muffler connected to said engine and located below said inlet portion of said duct, at least a part of said exhaust muffler being disposed within said duct means so that said exhaust muffler is cooled by at least a part of the air flow guided by said duct means.

11. A liquid-cooled engine system as defined in claim 10, wherein said duct means has an outlet end opening to the outside of the engine housing, said exhaust muffler being disposed at said outlet end of said duct means.

12. A liquid-cooled engine system according to claim 10, wherein said exhaust muffler is located forward of said engine.

13. A liquid-cooled engine system as defined in claim 10, including exhaust pipe means through which said exhaust muffler is connected to said engine, at least a half of said exhaust pipe means extending within said duct means.

14. A liquid-cooled engine system as defined in claim 13, wherein said exhaust muffler is arranged horizontally, and said exhaust pipe means comprises a pair of exhaust pipes having substantially the same length, said exhaust pipes being connected in parallel to said exhaust muffler.

15. A liquid-cooled engine system comprising:
    a liquid-cooled engine arranged within an engine housing,
    a radiator arranged within the engine housing, cooling liquid for said engine flowing through said radiator;
    means for generating air flow passing through said radiator to cause the air flow to cool the cooling liquid flowing through said radiator;
    duct means arranged within the engine housing, for guiding the air flow having passed through said radiator to the outside of the engine housing without exposure of the air flow to said engine, said duct means having an outlet end portion located at a lower forward region of said engine housing; and an exhaust muffler connected to said engine, at least a part of said exhaust muffler being disposed within said outlet end portion of said duct means so that said exhaust muffler is cooled by at least a part of the air flow guided by said duct means.

16. A liquid-cooled engine system as defined in claim 15, wherein said outlet end portion opens to the outside of the engine housing.

17. A liquid-cooled engine system according to claim 15 wherein said exhaust muffler is located forward of said engine.

18. A liquid-cooled engine system as defined in claim 15, including exhaust pipe means through which said exhaust muffler is connected to said engine, at least a half of said exhaust pipe means extending within said duct means.

19. A liquid-cooled engine system as defined in claim 18, wherein said exhaust muffler is arranged horizontally, and said exhaust pipe means comprises a pair of exhaust pipes having substantially the same length, said exhaust pipes being connected in parallel to said exhaust muffler.

* * * * *